(12) United States Patent
Trathnigg

(10) Patent No.: US 9,634,484 B2
(45) Date of Patent: Apr. 25, 2017

(54) BATTERY SYSTEM, VEHICLE WITH BATTERY SYSTEM AND METHOD OF OPERATING A BATTERY SYSTEM IN A VEHICLE

(71) Applicant: SAMSUNG SDI CO., LTD., Yongin-si, Gyeonggi-do (KR)

(72) Inventor: Thomas Trathnigg, Graz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 534 days.

(21) Appl. No.: 14/246,074

(22) Filed: Apr. 5, 2014

(65) Prior Publication Data
US 2014/0300183 A1 Oct. 9, 2014

(30) Foreign Application Priority Data

Apr. 5, 2013 (EP) .................................. 13162537

(51) Int. Cl.
*H02J 1/00* (2006.01)
*B60L 3/00* (2006.01)
(Continued)

(52) U.S. Cl.
CPC ............... *H02J 1/00* (2013.01); *B60L 3/003* (2013.01); *B60L 3/0046* (2013.01);
(Continued)

(58) Field of Classification Search
CPC ...................................................... H02J 1/00
(Continued)

(56) References Cited

U.S. PATENT DOCUMENTS

| 6,201,318 B1* | 3/2001 | Guillory | ................ | G01R 31/44 307/10.1 |
|---|---|---|---|---|
| 2003/0029654 A1 | 2/2003 | Shimane et al. | | |

(Continued)

FOREIGN PATENT DOCUMENTS

| CN | 101740839 A | 6/2010 |
|---|---|---|
| CN | 202840606 U | 3/2012 |

(Continued)

OTHER PUBLICATIONS

SIPO Office action dated Oct. 19, 2015, with English translation, corresponding to Chinese Patent application 201410128229.3, (13 pages).

(Continued)

*Primary Examiner* — Joseph Chang
(74) *Attorney, Agent, or Firm* — Lewis Roca Rothgerber Christie LLP

(57) ABSTRACT

A battery system, a vehicle having a battery system, and a method for operating a battery system. The battery system has a plurality of cells, a load circuit, a current sensor to detect current flowing in the load circuit, a pre-charging circuit to limit the current flowing through the load circuit, a disconnecting apparatus in a load circuit section of the load circuit, the load circuit section being bypassed by the pre-charging circuit, a first consumer circuit and a second consumer circuit arranged in parallel with one another and connected to the load circuit, a first fuse assigned to the first consumer circuit, a second fuse assigned to the second consumer circuit and an electronics unit to evaluate signals of the current sensor and which determines whether at least one of the first fuse and the second fuse has blown based on signals of the current sensor.

19 Claims, 3 Drawing Sheets

(51) Int. Cl.
    *B60L 3/04*         (2006.01)
    *B60L 11/18*      (2006.01)

(52) U.S. Cl.
    CPC ........... *B60L 3/0061* (2013.01); *B60L 3/0069* (2013.01); *B60L 3/04* (2013.01); *B60L 11/1803* (2013.01); *B60L 11/1816* (2013.01); *B60L 11/1864* (2013.01); *B60L 11/1868* (2013.01); *B60L 2210/12* (2013.01); *B60L 2210/30* (2013.01); *B60L 2240/549* (2013.01); *B60L 2270/20* (2013.01); *Y02T 10/7005* (2013.01); *Y02T 10/7061* (2013.01); *Y02T 10/7066* (2013.01); *Y02T 10/7072* (2013.01); *Y02T 10/7233* (2013.01); *Y02T 10/7241* (2013.01); *Y02T 90/127* (2013.01); *Y02T 90/14* (2013.01); *Y10T 307/25* (2015.04)

(58) Field of Classification Search
    USPC ........................................................ 307/10.1
    See application file for complete search history.

(56) References Cited

U.S. PATENT DOCUMENTS

| | | |
|---|---|---|
| 2010/0123989 A1 | 5/2010 | Kosaki et al. |
| 2010/0127663 A1 | 5/2010 | Furukawa |
| 2012/0055724 A1 | 3/2012 | Iwasa et al. |

FOREIGN PATENT DOCUMENTS

| | | |
|---|---|---|
| CN | 102438863 A | 5/2012 |
| JP | 2010-146773 A | 7/2010 |
| WO | 2010133934 A1 | 11/2010 |

OTHER PUBLICATIONS

SIPO Second Office Action dated Apr. 19, 2016, with English translation, corresponding to Chinese Patent application 201410128229.3, (4 pages).

\* cited by examiner

BATTERY SYSTEM, VEHICLE WITH BATTERY SYSTEM AND METHOD OF OPERATING A BATTERY SYSTEM IN A VEHICLE

CROSS-REFERENCE TO RELATED APPLICATIONS

The present application claims priority 35 U.S.C. §119 to European Patent Publication No. EP 13162537.8 (filed on Apr. 5, 2013) which is hereby incorporated by reference in its entirety.

TECHNICAL FIELD

Embodiments relate to a battery system, a vehicle having a battery system, and a method for operating a battery system.

The battery system has a plurality of cells, a load circuit at which the voltage of the cells is present, a current sensor to detect the current flowing in the load circuit, an electronics unit to evaluate signals of the current sensor, a pre-charging circuit connected to the load circuit to limit the current flowing through the load circuit by way of a resistor, a disconnecting apparatus in a load circuit section of the load circuit, wherein the load circuit section may be bypassed by the pre-charging circuit, a first consumer circuit and at least a second consumer circuit, which are arranged in parallel with one another and are connected to the load circuit, wherein at least one fuse is assigned to each consumer circuit.

In the vehicle having such a battery system, a first consumer capacitance is assigned to the first consumer circuit, and a second consumer capacitance is assigned to the second consumer circuit.

BACKGROUND

Battery systems having a plurality of cells are used in particular as energy stores for the drive for electric and hybrid vehicles. As overload protection, for example in the event of a short circuit in an electrical consumer assigned to the battery system, usually a fuse is arranged in the circuit between the battery system and the electrical consumer. If the current flowing in the circuit between the battery system and the electrical consumer reaches a limit value, the fuse blows, and thus, disconnects the circuit. If the cause of the increased current is eliminated, the battery system and the electrical consumer assigned to the battery system may be brought into operation again by replacing the fuse. Detecting whether the fuse has blown is a way of facilitating the maintenance of the vehicle having such a battery system.

Laid-open Japanese Patent Publication No. JP 2010-146773A discloses a battery system in which a monitoring apparatus for a battery pack is specified, in which tripping of a fuse is identified by voltage measurement at two measurement points within the battery pack and evaluation of the voltage measurement by a microcomputer. One disadvantage with this system is that a dedicated voltage measurement is required for detecting whether the fuse has blown. This firstly increases the complexity involved in the installation of the battery system since additional measuring lines are required. It also increases the complexity of the monitoring apparatus since additional signals need to be detected and converted into a suitable form. Such additional complexity is additionally multiplied when a plurality of electrical consumers having a respectively dedicated fuse are assigned to the battery system.

SUMMARY

Embodiments relate to enhanced battery systems, vehicles having such a battery system and a method for producing such a battery system for a vehicle, in which the blowing of a fuse is reliably identified and nevertheless is simple and inexpensive in terms of manufacture.

In accordance with embodiments, a battery system may include at least one of: a plurality of cells, a load circuit at which the voltage of the cells is present, a current sensor to detect current flowing in the load circuit, an electronics unit to evaluate signals of the current sensor, a pre-charging circuit connected to the load circuit to limit current flowing through the load circuit by way of a resistor, a disconnecting apparatus in a load circuit section of the load circuit, wherein the load circuit section may be bypassed by the pre-charging circuit, a first consumer circuit and at least a second consumer circuit, which are arranged in parallel with one another and are connected to the load circuit, wherein at least one fuse is assigned to each consumer circuit, the electronics unit detects, on the basis of signals of the current sensor, whether one of the fuses has blown.

In accordance with embodiments, a method for operating the above-noted battery system in a vehicle includes at least one of: detecting at least one of an actual current profile of current flowing in a load circuit during a pre-charging operation, and an actual charge quantity which is converted by current flowing in the load circuit in the pre-charging operation; comparing the actual current profile and the actual charge quantity with at least one of a stored plurality of setpoint current profiles and stored plurality of setpoint charge quantities, the setpoint current profiles and setpoint charge quantities corresponding to at least one of current flowing in the load circuit during the pre-charging operation and the charge quantity converted in the pre-charging operation; and on the basis of the comparison, determines whether a fuse has blown.

In accordance with embodiments, when the circuit between the battery system and the consumer is closed, first the capacitance of the consumer(s) is charged. In order to avoid a situation in which the disconnecting device is in the process loaded with an excessively high current, the circuit is first closed via the pre-charging circuit. The resistor in the pre-charging circuit limits the current.

The current profile set in the load circuit is dependent on the resistance, the summation voltage of the cells corresponding to their circuitry, the capacitance of the consumer and the voltage present at the capacitance prior to the pre-charging operation. If a plurality of electrical consumers are assigned in parallel to the load circuit, the effective capacitance for the current profile corresponds to the sum of the individual consumer capacitances. If all of these variables are known, the current profile to be expected may be determined in advance and stored in the electronics unit. Since the effective capacitance for the current profile changes when the fuse has blown in a consumer circuit, it is possible to determine, by measurement of the current flowing in the load circuit and comparison with the current profile to be expected, in respect of whether one of the fuses has blown.

Instead of the current profile, the time integral of the current may also be used. By generating the integral of the current, the charge quantity converted during the pre-charging operation is determined, with this charge quantity assuming a discrete value as soon as the effective capacitance during pre-charging is charged completely. The actual charge quantity determined in this way may be compared with an expected setpoint charge quantity, as a result of which it may be determined whether a fuse has blown. The comparison between the actual charge quantity and the setpoint charge quantity is technically equivalent to the comparison between the actual current profile and the setpoint current profile. In the corresponding data processing in the electronics unit, the comparison between two discrete values may have a simpler configuration than the comparison of two time profiles, however.

In accordance with embodiments, the consumer circuit represents a purely capacitive load, apart from structurally related slight resistances and inductances, during the pre-charging operation. Generally, this is the case for the pre-charging operation. If the consumer circuit were to be active i.e., if there were to be a significant voltage drop across the consumer, it would not be possible to reliably determine whether a fuse has blown.

In accordance with embodiments, the capacitance is largely discharged prior to the beginning of the pre-charging operation. Generally, this is the case prior to the beginning of a first pre-charging operation since the high-voltage capacitances in a vehicle generally have at least one discharge apparatus.

By virtue of such a discharge apparatus, the capacitance of a consumer is discharged as soon as the consumer is deactivated. If the capacitance were to be completely or almost completely charged, prior to the beginning of the pre-charging operation, during the pre-charging operation no or only a low current would flow. It would not be possible to reliably determine whether a fuse has blown in this case. If the capacitance is charged approximately to half or to less than half prior to the beginning of the pre-charging operation, however, a reliable determination whether a fuse has blown is possible without the temporal resolution of the detection of the current signal by the electronics unit needing to be increased to an unreasonable extent.

In accordance with embodiments, a plurality of setpoint current profiles may be stored in the electronics unit and each correspond to a current flowing in the load circuit during a pre-charging operation. Each stored setpoint current profile is characteristic of a current profile with at least one blown fuse. Furthermore, the electronics unit is to determine, on the basis of a comparison between the actual current profile and the stored setpoint current profiles, whether one of the fuses has blown. By providing a specific comparison possibility between the actual current profile and the specific setpoint current profiles, the determination that a fuse has actually blown is made more precisely. Other causes for an actual current profile deviating from the setpoint current profile, for example, caused by faults in one of the consumers itself, may therefore be ruled out with improved reliability.

In accordance with embodiments, the electronics unit is to determine, on the basis of a comparison between the actual current profile and the stored setpoint current profiles, which of the fuses has blown.

In accordance with embodiments, a vehicle includes at least one of: a battery system having a plurality of cells, a load circuit at which the voltage of the cells is present, a current sensor to detect current flowing in the load circuit, an electronics unit to evaluate signals of the current sensor, a pre-charging circuit connected to the load circuit to limit current flowing through the load circuit by way of a resistor, a disconnecting apparatus in a load circuit section of the load circuit, wherein the load circuit section may be bypassed by the pre-charging circuit, a first consumer circuit and at least a second consumer circuit, which are arranged in parallel with one another and are connected to the load circuit, wherein at least one fuse is assigned to each consumer circuit, the electronics unit detects, on the basis of signals of the current sensor, whether one of the fuses has blown, a first consumer capacitance assigned to the first consumer circuit, and a second consumer capacitance assigned to the second consumer circuit, wherein the first consumer capacitance has a capacitance of a different magnitude than a capacitance of the second consumer capacitance. By virtue of the different capacitances, the current profiles are distinguished from one another during a pre-charging operation, depending on which fuse has blown. The diagnosis during maintenance of the battery system is particularly facilitated by the decision as to which of the fuses has blown.

In accordance with embodiments, a first converter is connectable to the first consumer circuit and is to convert a direct current provided by the battery system into alternating current and to supply this alternating current to a drive motor of the vehicle. The first consumer capacitance acts as energy buffer store for the switching elements of the first converter and is also referred to as intermediate circuit capacitance. In order that there is no dip in the voltage at the switching elements during the switching operation, it is advantageous to connect the intermediate circuit capacitance to the switching elements with as low impendence and inductance as possible. Therefore, the first consumer capacitance may be arranged directly in the first converter.

In accordance with embodiments, a second converter may be connected to the second consumer circuit of the battery system and is to step down the voltage made available by the battery system and supply the stepped-down voltage to an electrical distribution system of the vehicle. The current requirement required for supporting the vehicle electrical distribution system is much lower in comparison with the current requirement of the vehicle drive motor. As a result, the second consumer capacitance assigned to the second converter as intermediate circuit capacitance is generally also lower than the first consumer capacitance.

In accordance with embodiments, the vehicle includes at least one of: a battery system having a plurality of cells, a load circuit at which the voltage of the cells is present, a current sensor to detect current flowing in the load circuit, an electronics unit to evaluate signals of the current sensor, a pre-charging circuit connected to the load circuit to limit current flowing through the load circuit by way of a resistor, a disconnecting apparatus in a load circuit section of the load circuit, wherein the load circuit section may be bypassed by the pre-charging circuit, a first consumer circuit and at least a second consumer circuit, which are arranged in parallel with one another and are connected to the load circuit, a third consumer circuit arranged in parallel with the first and second consumer circuits and connected to the load circuit; and a charger connected to the third consumer circuit and which charges the cells by way of an energy source located outside the vehicle, wherein at least one fuse is assigned to each consumer circuit, the electronics unit detects, on the basis of signals of the current sensor, whether one of the fuses has blown, a first consumer capacitance assigned to the first consumer circuit, and a second consumer capacitance assigned to the second consumer circuit, wherein the first consumer capacitance has a capacitance of a different magnitude than a capacitance of the second consumer capacitance In accordance with embodiments, the setpoint current profiles stored by the electronics unit characterize in each case a current profile flowing during a pre-charging operation with at least one blown fuse. By virtue of this characterization, an assignment of the actual current profile determined by the current sensor to the setpoint current profiles stored by the electronics unit, and therefore, an identification as to whether a fuse has blown is possible in a particularly simple manner.

In accordance with embodiments, the electronics unit determines, on the basis of a comparison between the actual current profile and the setpoint current profile, whether the fuse of any of the consumer circuits has blown. The diagnosis during the maintenance of the battery system is particularly facilitated by the distinction as to which of the fuses has blown.

In accordance with embodiments, a battery system includes at least one of: a plurality of cells; a load circuit at which the voltage of the cells is present; a current sensor to detect current flowing in the load circuit; a pre-charging circuit connected to the load circuit and which limits the current flowing through the load circuit; a disconnecting apparatus in a load circuit section of the load circuit, the load circuit section being bypassed by the pre-charging circuit; a first consumer circuit and a second consumer circuit arranged in parallel with one another and connected to the load circuit; a first fuse assigned to the first consumer circuit; a second fuse assigned to the second consumer circuit; and an electronics unit to evaluate signals of the current sensor and which determines whether at least one of the first fuse and the second fuse has blown based on signals of the current sensor.

In accordance with embodiments, a vehicle includes at least one of: a battery system having a plurality of cells, a load circuit at which the voltage of the cells is present, a current sensor to detect current flowing in the load circuit, a pre-charging circuit connected to the load circuit and which limits the current flowing through the load circuit, a disconnecting apparatus in a load circuit section of the load circuit, the load circuit section being bypassed by the pre-charging circuit, a first consumer circuit and a second consumer circuit arranged in parallel with one another and connected to the load circuit, a first fuse assigned to the first consumer circuit, a second fuse assigned to the second consumer circuit, and an electronics unit to evaluate signals of the current sensor and which determines whether at least one of the first fuse and the second fuse has blown based on signals of the current sensor; a first consumer capacitance assigned to the first consumer circuit and which has a first capacitance; and a second consumer capacitance assigned to the second consumer circuit and which has a second capacitance of a different magnitude than the first capacitance.

In accordance with embodiments, a method includes at least one of: detecting at least one of an actual current profile of current flowing in a load circuit during a pre-charging operation, and an actual charge quantity which is converted by current flowing in the load circuit in the pre-charging operation; comparing at least one of the actual current profile to at least one of a stored plurality of setpoint current profiles, and the actual charge quantity to a stored plurality of setpoint charge quantities, the setpoint current profiles and setpoint charge quantities corresponding to at least one of current flowing in the load circuit during the pre-charging operation and the charge quantity converted in the pre-charging operation; and determining whether a fuse has blown based on the comparison.

DRAWINGS

Embodiments will be illustrated by way of example in the drawings and explained in the description below.

DESCRIPTION

Figure 1:
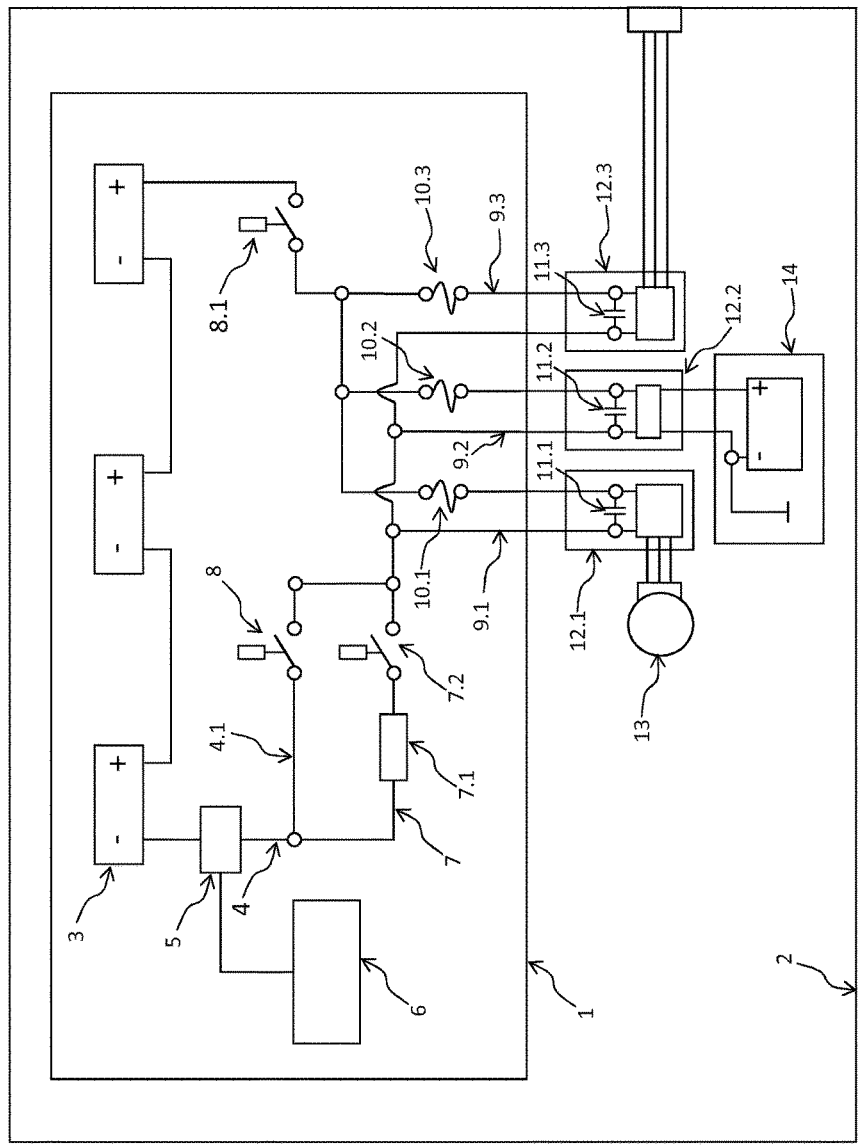
FIG. 1 illustrates a diagram of a vehicle having a battery system, in accordance with embodiments.

FIG. 1 illustrates a schematic illustration of a vehicle 2 having a battery system 1, in accordance with embodiments. The battery system 1 includes a plurality of cells 3 electrically conductively connected to one another in series. The summation voltage of the cells 3 is present at a load circuit 4. A first consumer circuit 9.1 has a first fuse 10.1 and is connected to the load circuit 4. A second consumer circuit 9.2 has a second fuse 10.2 and is likewise connected to the load circuit 4. The first consumer circuit 9.1 and the second consumer circuit 9.2 are arranged in parallel with one another. A third consumer circuit 9.3 having a third fuse 10.3, is connected to the load circuit 4 and arranged in parallel with the first consumer circuit 9.1 and the second consumer circuit 9.2.

A current sensor 5 is arranged in the load circuit 4 to detect current flowing in the load circuit 4. An electronics unit 6 is to evaluate signals of the current sensor 5. The load circuit 4 has a load circuit section 4.1, in which a disconnecting device 8 is arranged, by way of which the load circuit 4 may be interrupted. The load circuit section 4.1 of the load circuit 4 may be bypassed by a pre-charging circuit 7. The pre-charging circuit 7 has a resistor 7.1. The pre-charging circuit may be interrupted by a pre-charging circuit disconnecting device 7.2. The load circuit 4 may optionally also have an additional disconnecting device 8.1.

A first consumer capacitance 11.1 is assigned to the first consumer circuit 9.1. The first consumer capacitance 11.1 is part of a first converter 12.1, which is to convert direct current of the battery system 1 into alternating current and also supply the alternating current to a drive motor 13 of the vehicle 2. A second consumer capacitance 11.2 is assigned to the second consumer circuit 9.2. The second consumer capacitance 11.2 is part of a second converter, which is to step down the voltage made available by the battery system 1 and supply the stepped-down voltage to an electrical distribution system 14 of the vehicle 2. A third consumer capacitance 11.3 is assigned to the third consumer circuit 9.3 and also to a charger 12.3. The charger 12.3 is to charge the cells 3 by way of an energy source located outside the vehicle 2.

Figure 2:
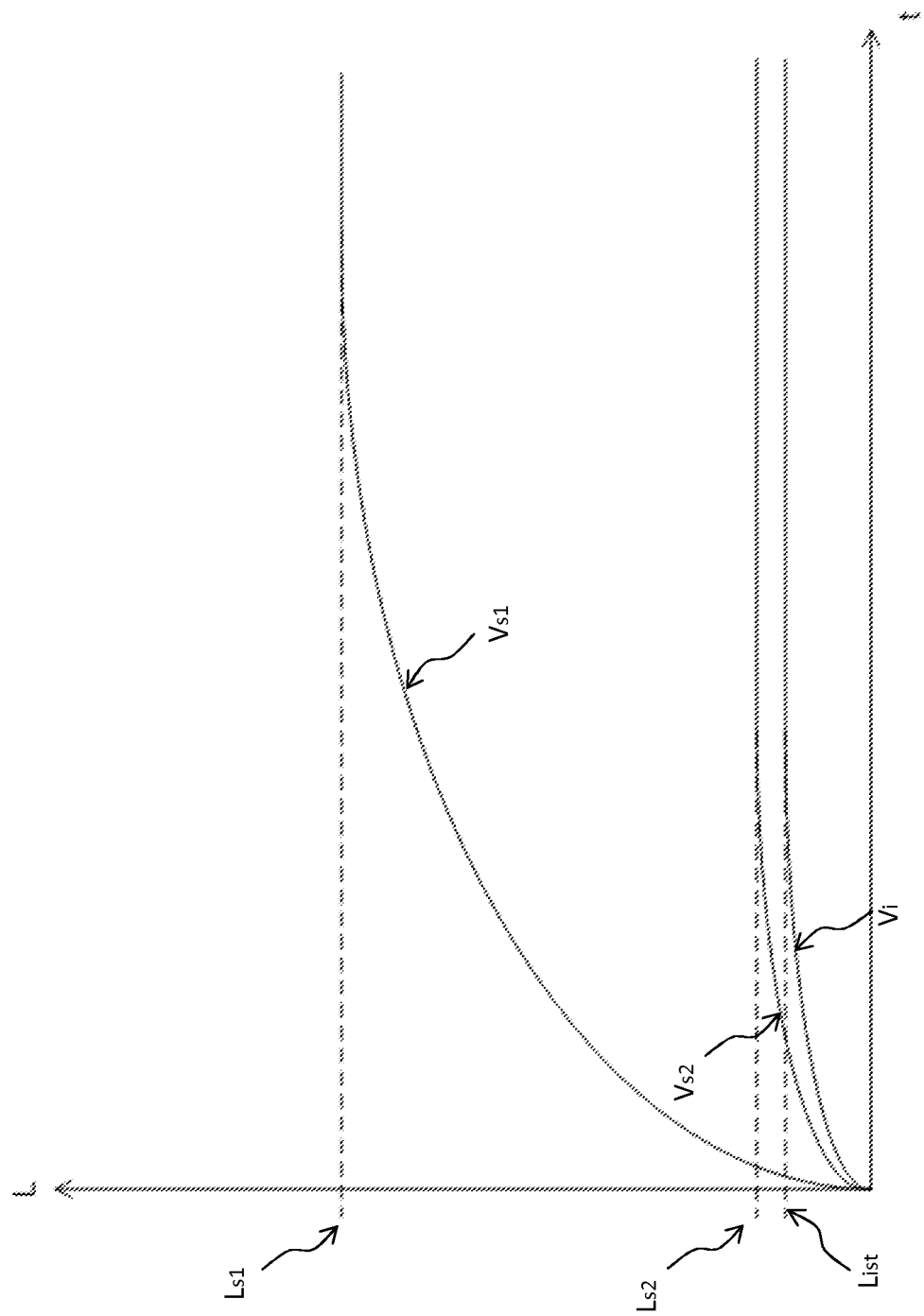
FIG. 2 illustrates time profiles of setpoint charge quantities converted during a pre-charging operation and the profile of an actual charge quantity, in accordance with embodiments.

FIG. 2 illustrates, schematically, a plurality of profiles of the charge quantity L converted during a pre-charging operation over time t. $V_{s1}$ corresponds to a first time profile of the charge quantity L converted during a pre-charging operation, during which all of the consumer capacitances 11.1, 11.2, 11.3 are effective. In the case of this first time profile $V_{s1}$, accordingly all of the fuses 10.1, 10.2, 10.3 of the consumer circuits 9.1, 9.2, 9.3 are intact. If all of the consumer capacitances 11.1, 11.2, 11.3 are completely charged, the first setpoint charge quantity converted in the process assumes the value $L_{s1}$. $V_{s2}$ corresponds to a second time profile of the charge quantity L converted during a pre-charging operation, during which only the second and third consumer capacitances 11.2, 11.3 are effective. The first consumer capacitance 11.1 is not effective, which makes it possible to conclude that the fuse of the first consumer circuit 10.1 has blown. The second converted setpoint charge quantity in the second time profile Vs2 assumes the value $L_{s2}$, which is markedly lower than the value $L_{s1}$ since the first consumer capacitance 11.1 has a lower capacitance than the second and third consumer capacitances 11.2, 11.3 together. The values of the first and second setpoint charge quantities $L_{s1}$ and $L_{s2}$ are stored by the electronics unit 6.

$V_i$ corresponds to the time profile of the actual charge quantity converted during a pre-charging operation, as is determined by the electronics unit 6 on the basis of the signals of current sensor 5. The actual charge quantity converted during this pre-charging operation assumes the value Li. The value of the measured charge quantity Li is compared with the values of the first and second setpoint charge quantities $L_{s1}$ and $L_{s2}$, which are stored by the electronics unit 6. If the magnitude of the difference between the actual charge quantity $L_i$ and the first or second setpoint charge quantity $L_{s1}$, $L_{s2}$ falls below a limit value, it may be reliably determined that the fuse 10.1 assigned to the first consumer circuit 9.1 has blown.

Figure 3:
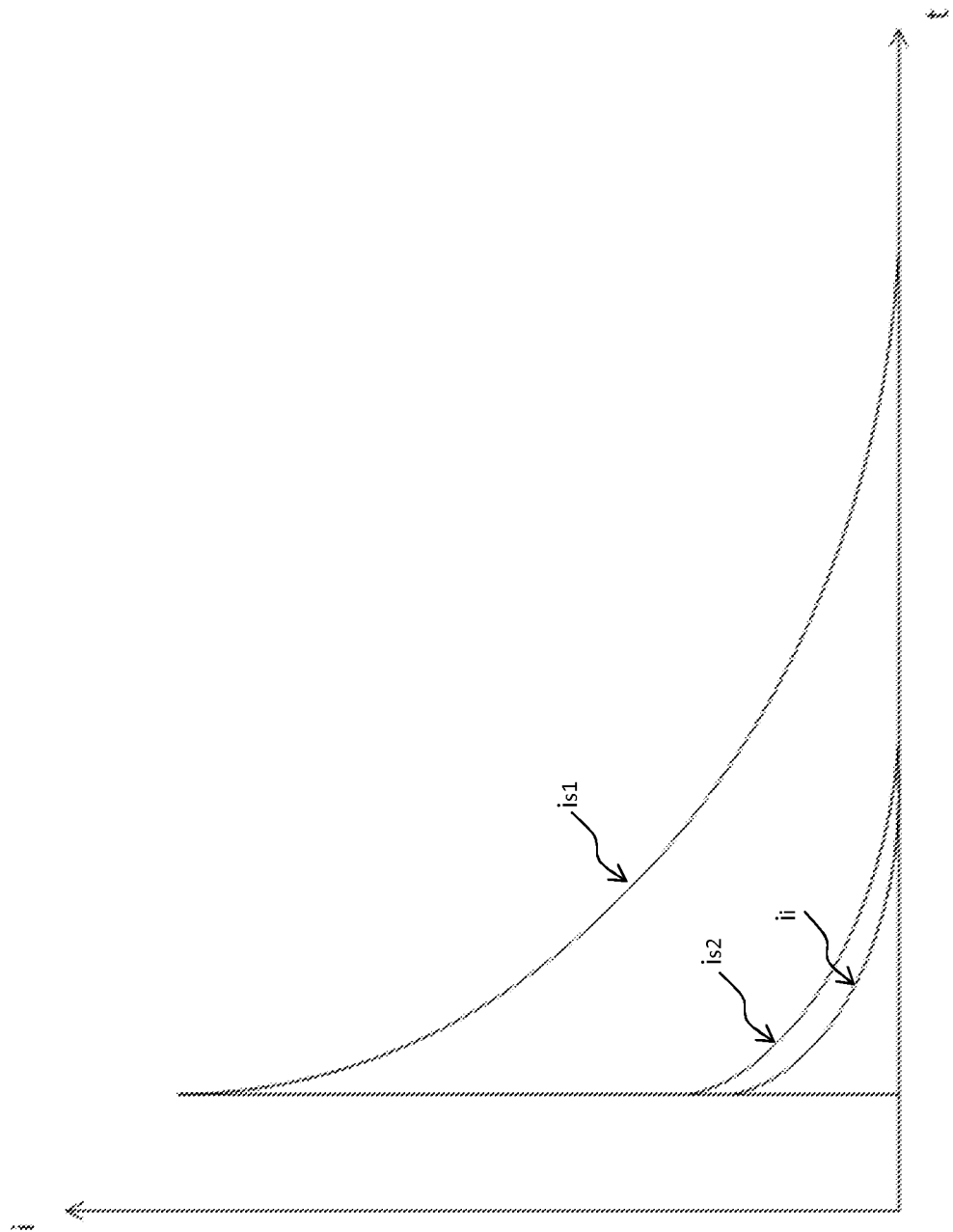
FIG. 3 illustrates setpoint current profiles over time and the actual current profile over time during a pre-charging operation, in accordance with embodiments.

FIG. 3 illustrates schematically a plurality of profiles of the current i flowing in the load circuit 4 over time t, as occurs during a pre-charging operation. $i_{s1}$ corresponds to a first setpoint current profile of the current flowing in the load circuit 4 during a pre-charging operation, in which all of the consumer capacitances 11.1, 11.2, 11.3 are effective. In the case of this first current profile $i_{s1}$, accordingly all of the fuses 10.1, 10.2, 10.3 of the consumer circuits 9.1, 9.2, 9.3 are intact. $i_{s2}$ corresponds to a second setpoint current profile of the current flowing in the load circuit 4 during a pre-charging operation, in which only the second and third consumer capacitances 11.2, 11.3 are effective. The first consumer capacitance 11.1 is not effective, which makes it possible to conclude that the fuse 10.1 assigned to the first consumer circuit 9.1 has blown. The first and second setpoint current profiles $i_{s1}$ and $i_{s2}$ are stored by the electronics unit 6.

$i_i$ corresponds to an actual current profile of the current flowing in the load circuit 4 during a pre-charging operation, as is determined by the current sensor 5. The actual current profile ii is compared with the setpoint current profiles $i_{s1}$ and $i_{s2}$ stored by the electronics unit 6 by way of said electronics unit 6, for example using suitable window functions. If it is identified in the process that the actual current profile $i_i$ largely corresponds to the setpoint current profile $i_{s2}$, it is possible to reliably draw the conclusion that the fuse 10.1 assigned to the first consumer circuit 9.1 has blown.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 Battery system
2 Vehicle
3 Cell
4 Load circuit
4.1 Load circuit section
Current sensor
6 Electronics unit
7 Pre-charging circuit
7.1 Resistor
7.2 Pre-charging circuit disconnecting device
8 Disconnecting device
8.1 Additional disconnecting device
9.1 First consumer circuit
9.2 Second consumer circuit
9.3 Third consumer circuit
10.1 Fuse of first consumer circuit
10.2 Fuse of second consumer circuit
10.3 Fuse of third consumer circuit
11.1 First consumer capacitance
11.2 Second consumer capacitance
11.3 Third consumer capacitance
12.1 First converter
12.2 Second converter
12.3 Third converter
13 Drive motor
14 Vehicle electrical distribution system
Vs1 First time profile of a setpoint charge quantity
Vs2 Second time profile of a setpoint charge quantity
Vi Time profile of an actual charge quantity
L Charge quantity
Ls1 First setpoint charge quantity
Ls2 Second setpoint charge quantity
Li Actual charge quantity
is1 First setpoint current profile
is2 Second setpoint current profile
ii Actual current profile
t Time

What is claimed is:
1. A battery system comprising:
a plurality of cells outputting a voltage;
a load circuit at which the voltage of the cells is present, the load circuit comprising a pre-charging circuit section and a load circuit section, the pre-charging circuit section limiting current flowing in the load circuit and being in parallel with the load circuit section;
a current sensor to detect the current flowing in the load circuit;
a disconnecting apparatus in the load circuit section of the load circuit, the load circuit section being bypassed by the pre-charging circuit section;
a first consumer circuit and a second consumer circuit arranged in parallel with one another and connected to the load circuit;
a first fuse assigned to the first consumer circuit;
a second fuse assigned to the second consumer circuit; and
an electronics unit to evaluate signals of the current sensor and comprising a memory to store a plurality of setpoint current profiles and a plurality of setpoint charge quantities, at least some of the setpoint current profiles and the setpoint charge quantities corresponding to the current flowing in the load circuit during a pre-charging operation, the electronics unit being configured to determine whether at least one of the first fuse and the second fuse has blown based on a comparison between the signals of the current sensor and at least one of the stored setpoint current profiles and/or the stored setpoint charge quantities.

2. The battery system of claim 1, wherein at least one of the stored setpoint current profiles is characteristic of a current profile of the current flowing in the load circuit during the pre-charging operation when at least one of the first fuse and the second fuse has blown.

3. The battery system of claim 1, wherein at least one of the setpoint charge quantities is characteristic of a converted charge quantity of the current flowing in the load circuit during the pre-charging operation when at least one of the first fuse and the second fuse has blown.

4. The battery system of claim 1, wherein:
at least one of the stored setpoint current profiles is characteristic of a current profile of the current flowing in the load circuit during the pre-charging operation when at least one of the first fuse and the second fuse has blown; and
at least one of the setpoint charge quantities is characteristic of a converted charge quantity of the current flowing in the load circuit during the pre-charging operation when at least one of the first fuse and the second fuse has blown.

5. The battery system of claim 1, wherein the electronics unit is configured to determine whether at least one of the first fuse and the second fuse has blown based on a comparison between an actual current profile and the stored setpoint current profiles.

6. The battery system of claim 1, wherein the electronics unit is configured to determine whether at least one of the first fuse and the second fuse has blown based on a comparison between an actual charge quantity and the stored setpoint charge quantities.

7. A vehicle comprising:
a battery system comprising a plurality of cells outputting a voltage, a load circuit at which the voltage of the cells is present, the load circuit comprising a pre-charging circuit section and a load circuit section, the pre-charging circuit section limiting current flowing in the load circuit and being in parallel with the load circuit section, a current sensor to detect the current flowing in the load circuit, a disconnecting apparatus in the load circuit section of the load circuit, the load circuit section being bypassed by the pre-charging circuit section, a first consumer circuit and a second consumer circuit arranged in parallel with one another and connected to the load circuit, a first fuse assigned to the first consumer circuit, a second fuse assigned to the second consumer circuit, and an electronics unit to evaluate signals of the current sensor and comprising a memory to store a plurality of setpoint current profiles and a plurality of setpoint charge quantities, at least some of the setpoint current profiles and the setpoint charge quantities corresponding to the current flowing in the load circuit during a pre-charging operation, the electronics unit being configured to determine whether at least one of the first fuse and the second fuse has blown based on a comparison between the signals of the current sensor and at least one of the stored setpoint current profiles and/or the stored setpoint charge quantities;
a first consumer capacitance assigned to the first consumer circuit and which has a first capacitance; and
a second consumer capacitance assigned to the second consumer circuit and which has a second capacitance of a different magnitude than the first capacitance.

8. The vehicle of claim 7, further comprising:
a drive motor; and
a first converter connected to the first consumer circuit to convert a direct current provided by the cells into an alternating current and to supply the alternating current to the drive motor.

9. The vehicle of claim 7, further comprising:
an electrical distribution system; and
a second converter connected to the second consumer circuit to step down the voltage of the cells and to supply the stepped-down voltage to the electrical distribution system.

10. The vehicle of claim 7, wherein the battery system further comprises:
a third consumer circuit arranged in parallel with the first consumer circuit and the second consumer circuit and connected to the load circuit;
a third fuse assigned to the third consumer circuit; and
a charger connected to the third consumer circuit to charge the cells by way of an energy source located outside the vehicle.

11. The vehicle of claim 7, wherein:
at least one of the stored setpoint current profiles is characteristic of a current profile of the current flowing in the load circuit during the pre-charging operation when at least one of the first fuse and the second fuse has blown.

12. The vehicle of claim 7, wherein:
at least one of the setpoint charge quantities is characteristic of a converted charge quantity of the current flowing in the load circuit during the pre-charging operation when at least one of the first fuse and the second fuse has blown.

13. The vehicle of claim 7, wherein the electronics unit determines whether at least one of the first fuse and the second fuse has blown based on a comparison between an actual current profile and the stored setpoint current profiles.

14. The vehicle of claim 7, wherein the electronics unit determines whether at least one of the first fuse and the second fuse has blown based on a comparison between an actual charge quantity and the stored setpoint charge quantities.

15. The vehicle of claim 7, wherein:
at least one of the stored setpoint current profiles is characteristic of a current profile of the current flowing in the load circuit during the pre-charging operation when at least one of the first fuse and the second fuse has blown; and
at least one of the setpoint charge quantities is characteristic of a converted charge quantity of the current flowing in the load circuit during the pre-charging operation when at least one of the first fuse and the second fuse has blown.

16. A method for operating a battery system of a vehicle, the method comprising:
detecting at least one of an actual current profile of current flowing in a load circuit during a pre-charging operation and an actual charge quantity which is converted by current flowing in the load circuit in the pre-charging operation;

comparing the actual current profile to a stored plurality of setpoint current profiles or the actual charge quantity to a stored plurality of setpoint charge quantities, the setpoint current profiles corresponding to the current flowing in the load circuit during the pre-charging operation, and the setpoint charge quantities corresponding to the charge quantity converted in the pre-charging operation; and determining whether a fuse has blown based on the comparison.

17. The method of claim 16, wherein at least one of the stored setpoint current profiles is characteristic of a current profile flowing during the pre-charging operation when the fuse has blown.

18. The method of claim 16, wherein at least one of the setpoint charge quantities is characteristic of a converted charge quantity during the pre-charging operation when the fuse has blown.

19. The method of claim 16, wherein determining whether the fuse has blown comprises comparing one of:

the actual current profile and the setpoint current profiles; and the actual charge quantity and the setpoint charge quantities.

\* \* \* \* \*